US010466377B2

(12) United States Patent
van Borselen et al.

(10) Patent No.: US 10,466,377 B2
(45) Date of Patent: Nov. 5, 2019

(54) METHODS AND SYSTEMS FOR DEGHOSTING MARINE SEISMIC WAVEFIELDS USING COST-FUNCTIONAL MINIMIZATION

(75) Inventors: Roald van Borselen, Voorschoten (NL); Peter M. van den Berg, The Hague (NL); Jacob T. Fokkema, Schiedam (NL)

(73) Assignee: PGS Geophysical AS, Oslo (NO)

( * ) Notice: Subject to any disclaimer, the term of this patent is extended or adjusted under 35 U.S.C. 154(b) by 1200 days.

(21) Appl. No.: 13/407,049

(22) Filed: Feb. 28, 2012

(65) Prior Publication Data
US 2013/0226463 A1  Aug. 29, 2013

(51) Int. Cl.
*G01V 1/36* (2006.01)

(52) U.S. Cl.
CPC ............ *G01V 1/36* (2013.01); *G01V 2210/56* (2013.01)

(58) Field of Classification Search
CPC ......................... G01V 2210/56; G01V 1/36
USPC ................... 702/14, 17, 32; 367/24
See application file for complete search history.

(56) References Cited

U.S. PATENT DOCUMENTS

2002/0103606 A1* 8/2002 Fokkema ............... G01V 1/364
702/32

2003/0220744 A1   11/2003 Schonewille
2005/0013194 A1*  1/2005 Vaage .................... G01V 1/364
367/24
2011/0134718 A1*  6/2011 van Borselen et al. ........ 367/24

FOREIGN PATENT DOCUMENTS

EP  2330443 A2  6/2011
WO  0244758 A2  6/2002

OTHER PUBLICATIONS

Fokkema, J.T., Reflection and Transmission of Elastic Waves by the Spatially Periodic Interface Between Two Solids (Thyeory of the Imtegral-Equation Method), Wave Motion 2, (1980), pp. 375-393.
Van Den Berg, P.M. et al., "Multiplicative regularization for contrast profile inversion", Radio Science, vol. 38, No. 2, Apr. 22, 2003, pp. 23-1-23-10.
Abubakar, A., et al., "A multiplicative regularization approach for deblurring problems", IEEE, vol. 13, Issue 11, Oct. 18, 2004, Abstract Only.
Mexican Communication of the Substantive Examination Report dated Jan. 26, 2015, in the prosecution of Mexican patent application MX/a/2013/002344, and English translation thereof, 6 pages.
Extended European Search Report dated Jan. 26, 2016, in the prosecution of patent application 13157039.2-1559, 6 pages.

* cited by examiner

Primary Examiner — Manuel L Barbee

(57) ABSTRACT

Systems and methods to determine a deghosted wavefield are described. In one aspect, the method computationally transforms recorded wavefield data from the space-time domain to a spectral domain and computationally deghosts the wavefield data in the wavenumber-frequency domain based on iterative minimization of a cost functional. The deghosted wavefield data may be transformed from the spectral domain back to the space-time domain and stored.

20 Claims, 10 Drawing Sheets

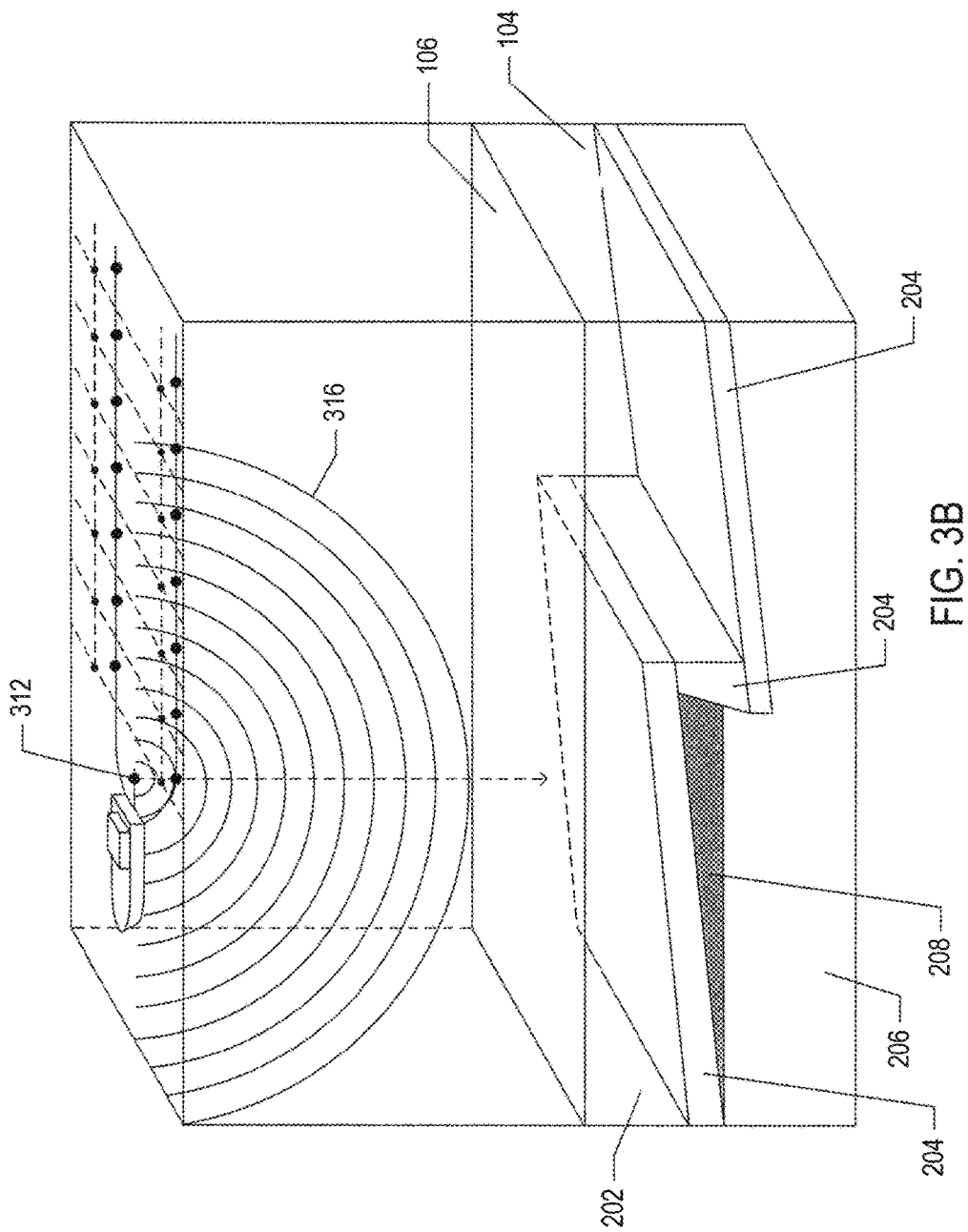

US 10,466,377 B2

METHODS AND SYSTEMS FOR DEGHOSTING MARINE SEISMIC WAVEFIELDS USING COST-FUNCTIONAL MINIMIZATION

BACKGROUND

In the past few decades, the petroleum industry has invested heavily in the development of marine seismic survey techniques that yield knowledge of subterranean formations beneath a body of water in order to find and extract valuable mineral resources, such as oil and natural gas. High-resolution seismic images of a subterranean formation are essential for quantitative seismic interpretation and improved reservoir monitoring. For a typical marine seismic survey, an exploration-seismology vessel tows one or more seismic sources and one or more streamers below the surface of the water and over a subterranean formation to be surveyed for mineral deposits. The vessel contains seismic acquisition equipment, such as navigation control, seismic source control, seismic receiver control, and recording equipment. The seismic source control causes the one or more seismic sources, which are typically air guns, to produce acoustic impulses at selected times. Each impulse is a sound wave that travels down through the water and into the subterranean formation. At each interface between different types of rock, a portion of the sound wave is refracted, a portion of the sound wave is transmitted, and another portion is reflected back into the body of water to propagate toward the surface. The streamers towed behind the vessel are elongated cable-like structures. Each streamer includes a number of seismic receivers or sensors that detect pressure and/or particle motion changes in the water created by the sound waves reflected back into the water from the subterranean formation.

The sounds waves that propagate upwardly from the subterranean formation are referred to as "up-going" wavefields that are detected by the receivers and converted into seismic signals that are recorded by the recording equipment and processed to produce seismic images that characterize the geological structure and properties of the subterranean formation being surveyed. However, the up-going sound waves continue to propagate beyond the streamers to the water surface from which the waves are downwardly reflected or "down-going" wavefields that are also detected by the receivers. The down-going waves are referred to as "ghost reflections." The ghost reflections can be phase-shifted by as much as 180 degrees relative to the up-going waves. The ghost reflections amplify some frequencies and attenuate other frequencies in the waves detected by the receivers and are sent as "ghost" signals from the receivers to the recording equipment. The ghost signals are manifest as spectral notches in the recorded seismic signals, which make it difficult to obtain accurate high-resolution seismic images of the subterranean formation. As a result, those working in the petroleum industry continue to seek systems and methods to remove the effects of ghost reflections, or "deghost," seismic signals.

DESCRIPTION OF THE DRAWINGS

FIGS. 3A-3C show an exploration-seismology method by which digitally encoded data is instrumentally acquired for subsequent exploration-seismology processing and analysis in order to characterize the structures and distributions of features and materials underlying the solid surface of the earth.

DETAILED DESCRIPTION

This disclosure is directed to computational methods and systems for deghosting marine seismic streamer data. In particular, an exploration-seismology vessel tows a number of streamers that form a data acquisition surface located beneath an air/fluid surface referred to as the "free surface." The streamers include receivers that measure pressure or particle motion wavefields, which are digitally encoded and stored. The method computationally transforms the recorded wavefield data from the space-time domain to a wavenumber-frequency domain and computationally deghosts the wavefield data in the wavenumber-frequency domain. The deghosted wavefield data may then be transformed computationally from the wavenumber-frequency domain back to the space-time domain and stored. The computational methods are based on iterative minimization of a cost functional in the wavenumber-frequency domain. The cost functional includes a multiplicative regularization factor that avoids experimentally-based tuning processes and uses a modest amount of a-priori information based on a minimum variation restriction in calculating the deghosted wavefield.

The following discussion includes two subsections: (1) an overview of exploration seismology; and (2) a discussion of a computational processing method for deghosting seismic signal data as an example of computational processing methods and systems to which this disclosure is directed. Reading of the first subsection can be omitted by those familiar with exploration seismology and acoustic-wave-equation solution methods.

I. An Overview of Exploration Seismology

Figure 1:
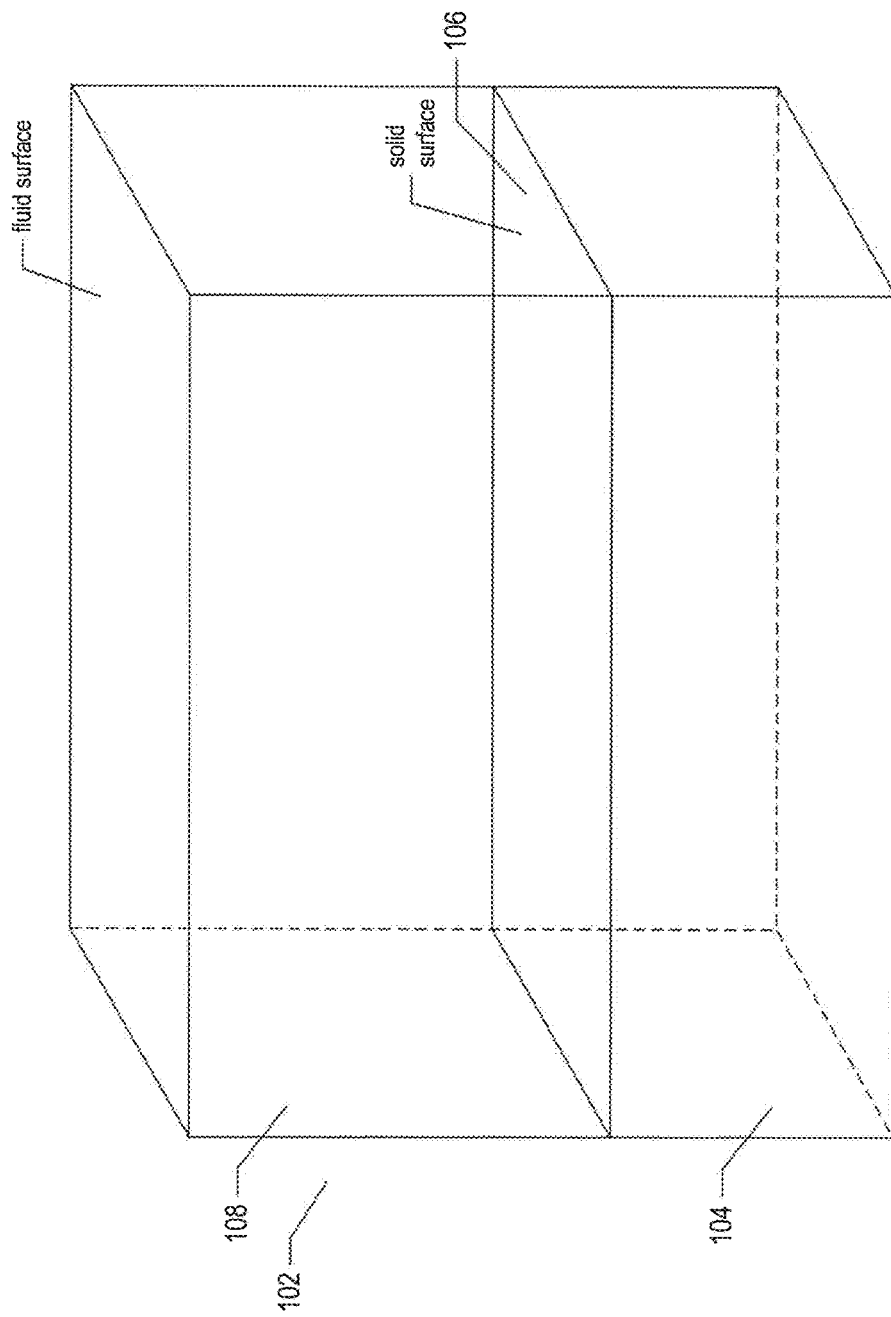
FIG. 1 shows a domain volume of the earth's surface.

FIG. 1 shows a domain volume of the earth's surface. The domain volume 102 comprises a solid volume of sediment and rock 104 below the solid surface 106 of the earth that, in turn, underlies a fluid volume of water 108 within an ocean, an inlet or bay, or a large freshwater lake. The domain volume shown in FIG. 1 represents an example experimental domain for a class of exploration-seismology observational and analytical techniques and systems referred to as "marine exploration seismology."

Figure 2:
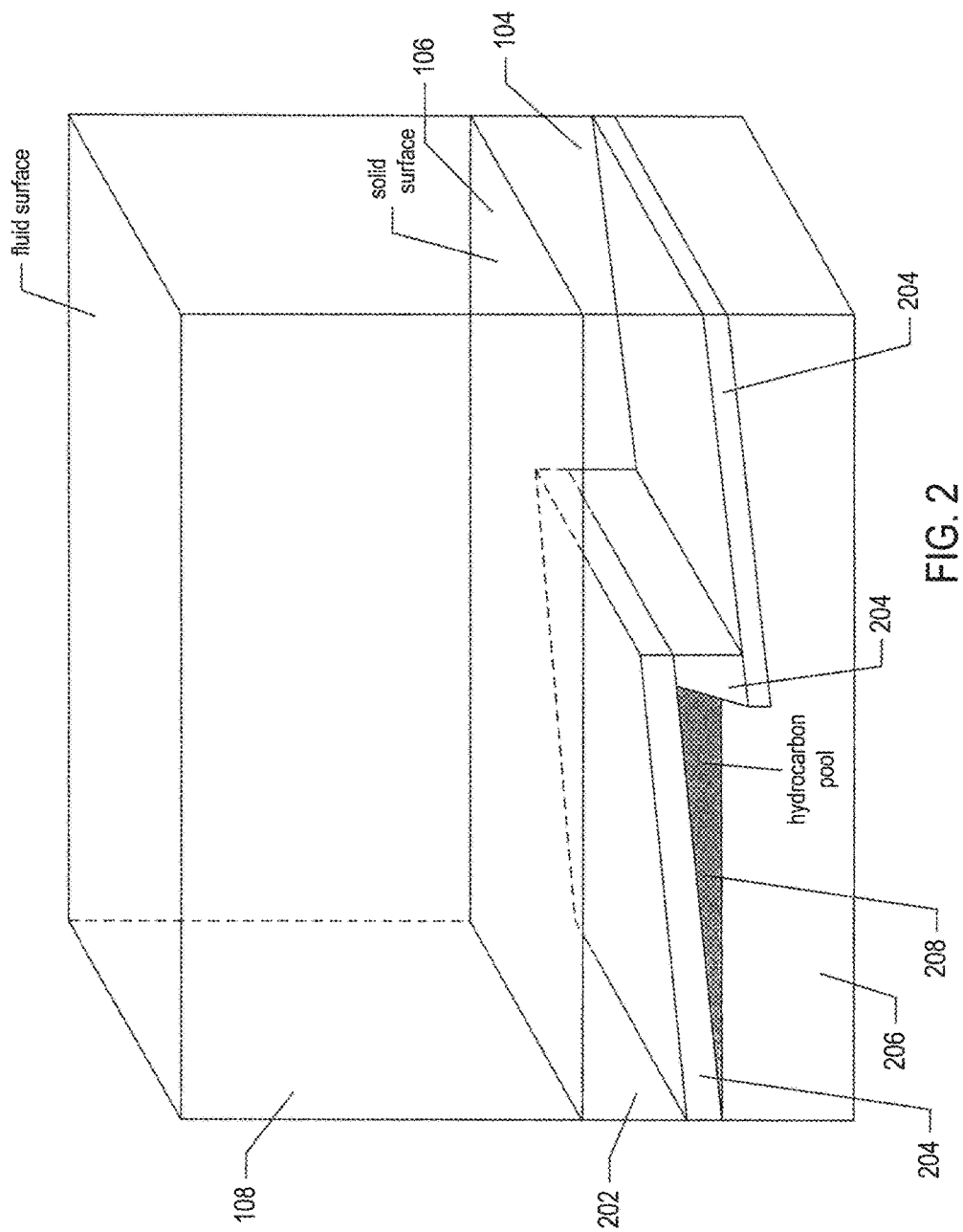
FIG. 2 shows subsurface features of a subterranean formation in the lower portion of the domain volume shown in FIG. 1.

FIG. 2 shows subsurface features of a subterranean formation in the lower portion of the domain volume shown in FIG. 1. As shown in FIG. 2, for exploration-seismology purposes, the fluid volume 108 is a relatively featureless, generally homogeneous volume overlying the solid volume 104 of interest. However, while the fluid volume can be explored, analyzed, and characterized with relative precision using many different types of methods and probes, including remote-sensing submersibles, sonar, and other such devices and methods, the volume of solid crust 104 underlying the fluid volume is comparatively far more difficult to probe and characterize. Unlike the overlying fluid volume, the solid volume is significantly heterogeneous and anisotropic, and includes many different types of features and materials of interest to exploration seismologists. For example, as shown in FIG. 2, the solid volume 104 may include a first sediment layer 202, a first fractured and uplifted rock layer 204, and a second, underlying rock layer 206 below the first rock layer. In certain cases, the second rock layer 206 may be porous and contain a significant concentration of liquid hydrocarbon 208 that is less dense than the second-rock-layer material and that therefore rises upward within the second rock layer. In the case shown in FIG. 2, the first rock layer 204 is not porous, and therefore forms a lid that prevents further upward migration of the liquid hydrocarbon, which therefore pools in a hydrocarbon-saturated layer 208 below the first rock layer 204. One goal of exploration seismology is to identify the locations of hydrocarbon-saturated porous strata within volumes of the earth's crust underlying the solid surface of the earth.

Figure 3A:
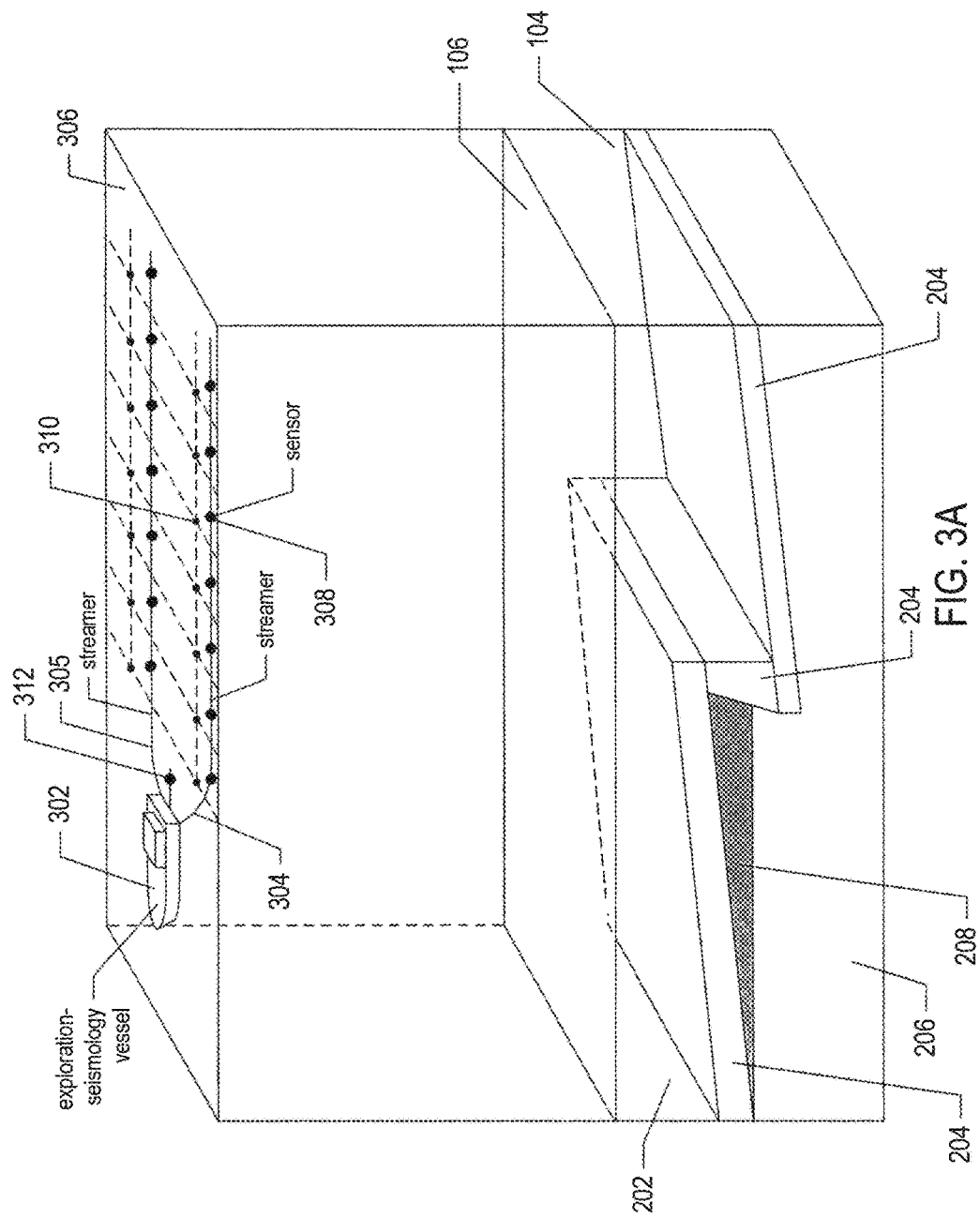
Figure 3C:
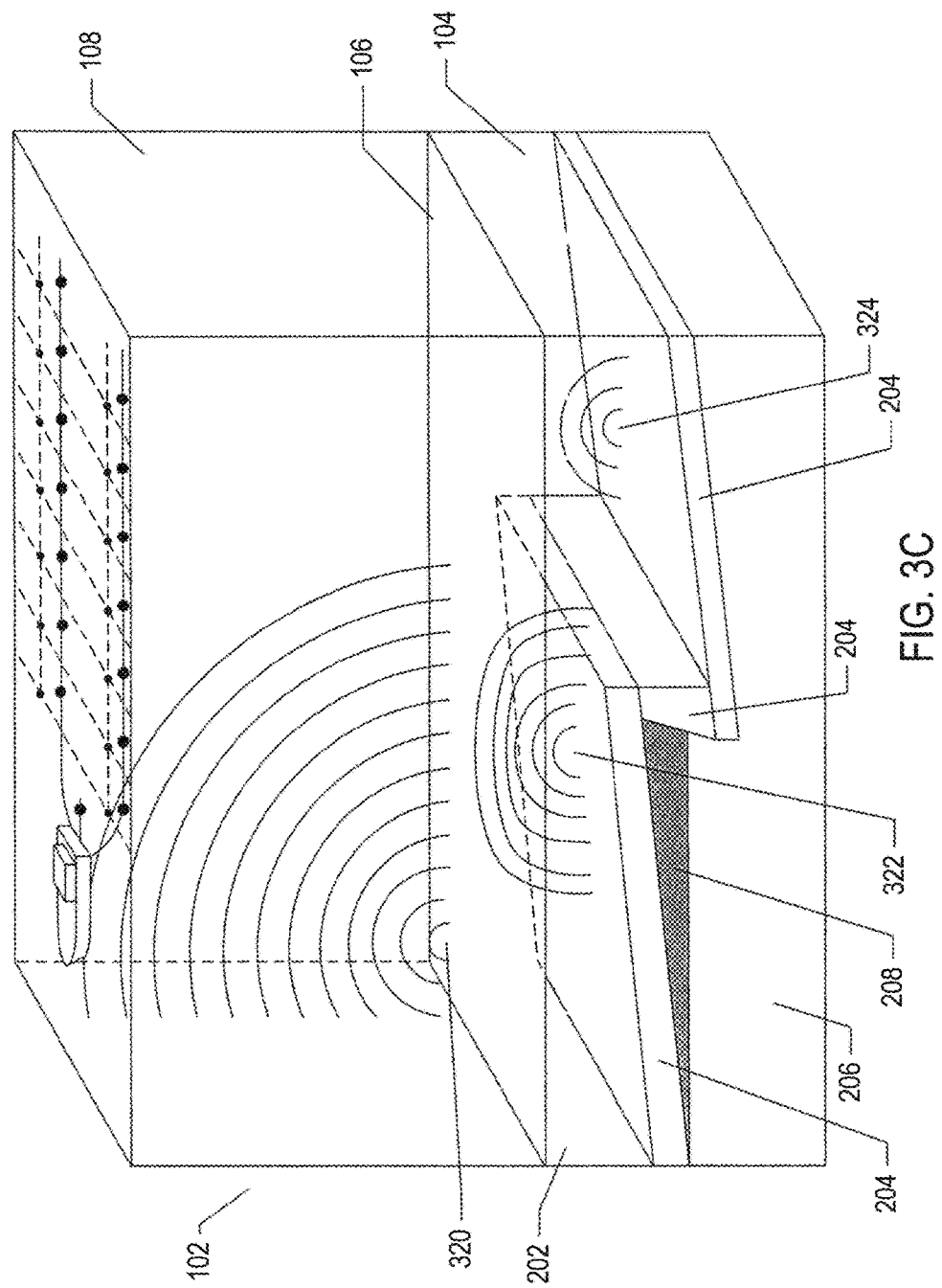

FIGS. 3A-3C show an exploration-seismology method by which digitally encoded data is instrumentally acquired for subsequent exploration-seismology processing and analysis in order to characterize the structures and distributions of features and materials of a subterranean formation. FIG. 3A shows an example of an exploration-seismology vessel 302 equipped to carry out a continuous series of exploration-seismology experiments and data collections. In particular, the vessel 302 tows one or more streamers 304-305 across an approximately constant-depth plane generally located a number of meters below the free surface 306. The streamers 304-305 are long cables containing power and data-transmission lines to which receivers, also referred to as "sensors," are connected at regular intervals. In one type of exploration seismology, each receiver, such as the receiver represented by the shaded disk 308 in FIG. 3A, comprises a pair of seismic receivers including a geophone, which detects vertical displacement within the fluid medium over time by detecting particle velocities or accelerations, and a hydrophone, which detects variations in pressure over time. The streamers 304-305 and the vessel 302 include sophisticated sensing electronics and data-processing facilities that allow receiver readings to be correlated with absolute positions on the free surface and absolute three-dimensional positions with respect to an arbitrary three-dimensional coordinate system. In FIG. 3A, the receivers along the streamers are shown to lie below the free surface 306, with the receiver positions correlated with overlying surface positions, such as a surface position 310 correlated with the position of receiver 308. The vessel 302 also tows one or more acoustic-wave sources 312 that produce pressure impulses at spatial and temporal intervals as the vessel 302 and towed streamers 304-305 move across the free surface 306.

FIG. 3B shows an expanding, spherical acoustic wavefront, represented by semicircles of increasing radius centered at the acoustic source 312, such as semicircle 316, following an acoustic pulse emitted by the acoustic source 312. The wavefronts are, in effect, shown in vertical plane cross section in FIG. 3B. As shown in FIG. 3C, the outward and downward expanding acoustic wavefield, shown in FIG. 3B, eventually reaches the solid surface 106, at which point the outward and downward expanding acoustic waves partially reflect from the solid surface and partially refract downward into the solid volume, becoming elastic waves within the solid volume. In other words, in the fluid volume, the waves are compressional pressure waves, or P-waves, the propagation of which can be modeled by the acoustic-wave equation while, in a solid volume, the waves include both P-waves and transverse waves, or S-waves, the propagation of which can be modeled by the elastic-wave equation. Within the solid volume, at each interface between different types of materials or at discontinuities in density or in one or more of various other physical characteristics or parameters, downward propagating waves are partially reflected and partially refracted, as at solid surface 106. As a result, each point of the solid surface and within the underlying solid volume 104 becomes a potential secondary point source from which acoustic and elastic waves, respectively, may emanate upward toward receivers in response to the pressure impulse emitted by the acoustic source 312 and downward-propagating elastic waves generated from the pressure impulse.

As shown in FIG. 3C, secondary waves of significant amplitude are generally emitted from points on or close to the solid surface 106, such as point 320, and from points on or very close to a discontinuity in the solid volume, such as points 322 and 324. Tertiary waves may be emitted from the free surface back towards the solid surface in response to secondary waves emitted from the solid surface and subsurface features.

FIG. 3C also shows the fact that secondary waves are generally emitted at different times within a range of times following the initial pressure impulse. A point on the solid surface, such as point 320, receives a pressure disturbance corresponding to the initial pressure impulse more quickly than a point within the solid volume, such as points 322 and 324. Similarly, a point on the solid surface directly underlying the acoustic source receives the pressure impulse sooner than a more distant-lying point on the solid surface. Thus, the times at which secondary and higher-order waves are emitted from various points within the solid volume are related to the distance, in three-dimensional space, of the points from the acoustic source.

Acoustic and elastic waves, however, travel at different velocities within different materials as well as within the same material under different pressures. Therefore, the travel times of the initial pressure impulse and secondary waves emitted in response to the initial pressure impulse are complex functions of distance from the acoustic source as well as the materials and physical characteristics of the materials through which the acoustic wave corresponding to the initial pressure impulse travels. In addition, as shown in FIG. 3C for the secondary wave emitted from point 322, the shapes of the expanding wavefronts may be altered as the wavefronts cross interfaces and as the velocity of sound varies in the media traversed by the wave. The superposition of waves emitted from within the domain volume 102 in response to the initial pressure impulse is a generally very complicated wavefield that includes information about the shapes, sizes, and material characteristics of the domain volume 102, including information about the shapes, sizes, and locations of the various reflecting features within the subterranean formation of interest to exploration seismologists.

Figure 4A:
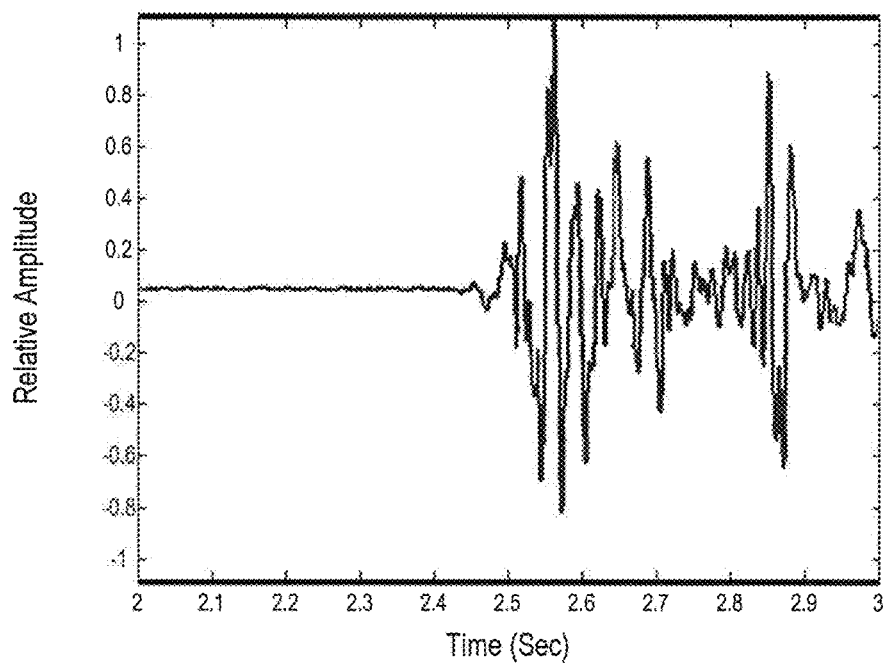
FIGS. 4A-4B show processed waveforms generated from hydrophone and geophone outputs, respectively.
Figure 4B:
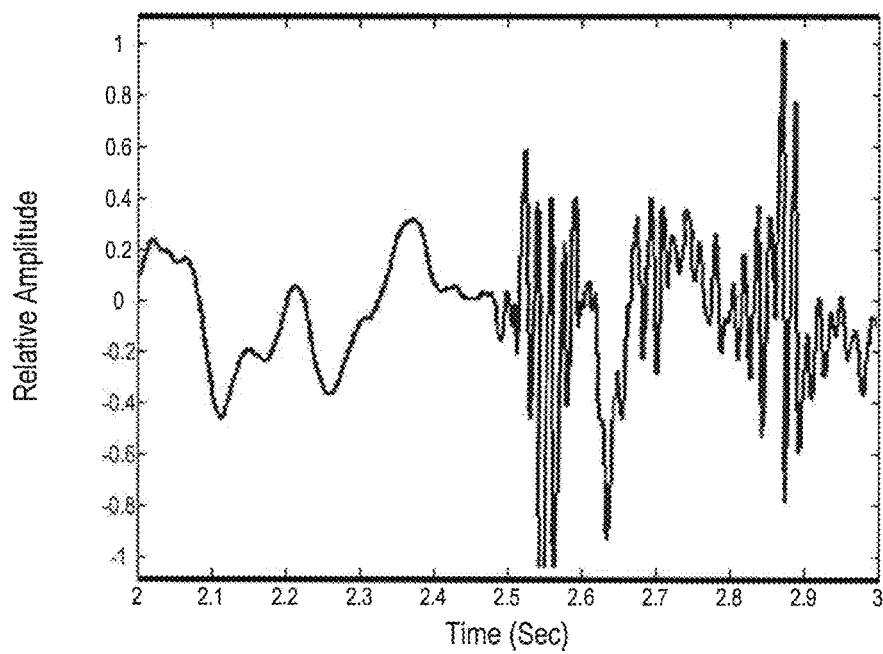

The complicated wavefield that ensues in response to the initial pressure impulse is sampled, over time, by the receivers positioned along the streamers towed by an exploration-seismology vessel. FIGS. 4A-4B show processed waveforms generated from hydrophone and geophone outputs, respectively. As shown in FIG. 4A, the waveform recorded by the hydrophone represents the pressure at times following the initial pressure impulse, with the amplitude of the waveform at a point in time related to the pressure at the hydrophone at the point in time. Similarly, as shown in FIG. 4B, the geophone provides an indication of the fluid velocity or acceleration, in a vertical direction, with respect to time.

The pressure and velocity wavefields also include ghost reflections that, when not properly accounted for, create ghost signals in the recorded waveforms. The ghost signals can lead to inaccurate seismic images of the subterranean formation located beneath the fluid volume. This disclosure is directed to computational methods and systems for deghosting seismic signal data.

II. A Method to Deghost Marine Seismic Data

Many seismic data processing techniques can be expressed generally in the form of a matrix operator equation:

$$Lu=f$$

where L is a matrix operator, f represents seismic data, and u represents a desired solution. However, in many cases the operator L is ill-posed, which means Lu is insensitive to small variations in u and attempts to solve the matrix operator equation for u using direct inversion of the operator L often leads to an unstable result for u. In practice, various regularization terms can be included in the matrix operator equation to solve for u. However, the parameters of the regularization terms are typically determined from hands-on experiments. In other words, a suitable result for u is often determined through experimentation rather than being predicated on scientific and mathematical principles. By contrast, the computational methods described below for deghosting marine seismic data are repeatable and capable of automation, because the computational methods described herein do not require heuristic human judgment. For this reason, these methods are described with reference to numerous equations. Firstly, the methods described below utilize a multiplicative regularization factor that avoids experimentally based tuning processes. Secondly, modest a-priori information is used by requiring variation of a sought after solution to be a minimum.

A. The Wavefield in the Space-Time Domain

Figure 5A:
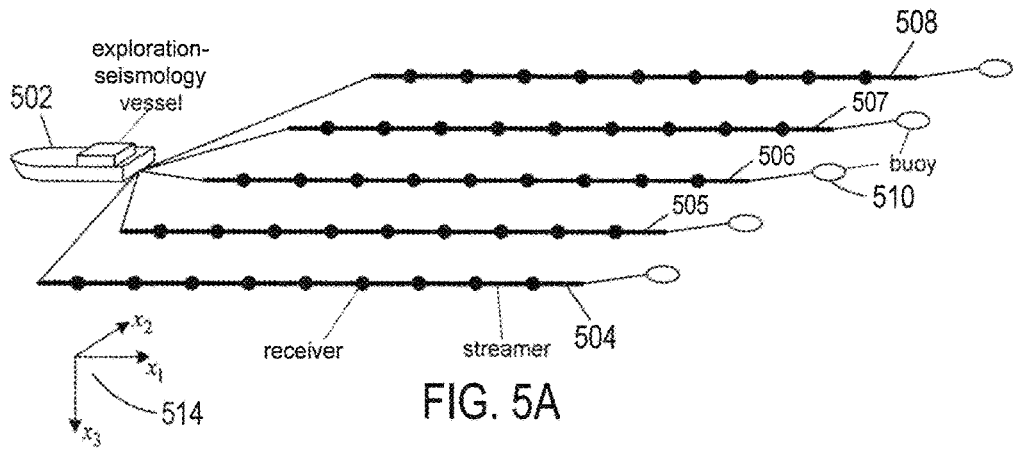
FIGS. 5A-5C show isometric, top, and side views, respectively, of an example exploration-seismology vessel towing five separate streamers located within a fluid volume.
Figure 5B:
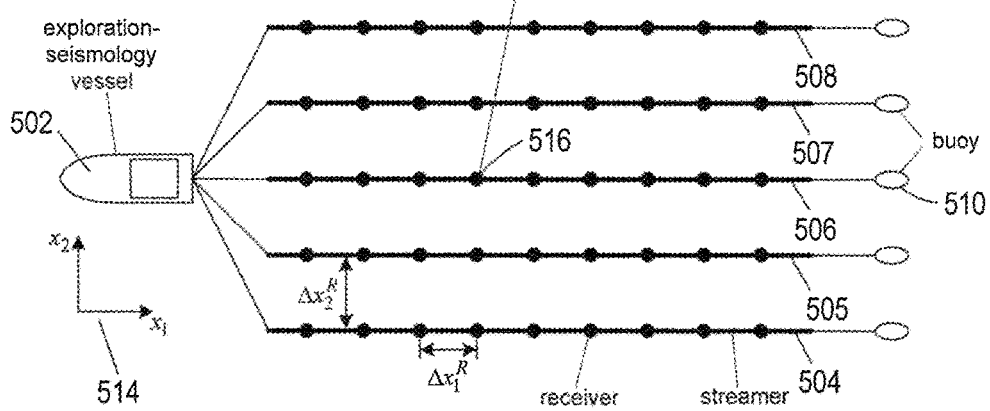
Figure 5C:
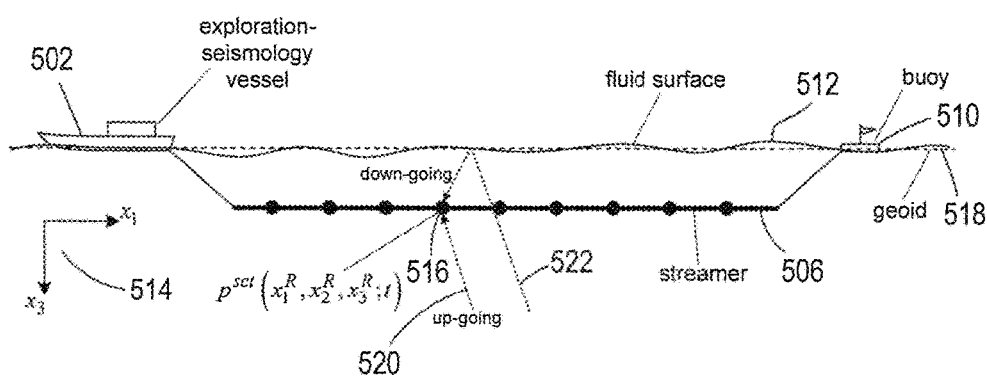

FIGS. 5A-5C show isometric, top, and side views, respectively, of an example exploration-seismology vessel 502 towing five separate streamers 504-508 located within a fluid volume. In practice, the vessel 502 can tow fewer than five streamers or more than five streamers. The vessel 502 may also tow one or more seismic sources that are not shown in FIGS. 5A-5C. Each streamer is attached at one end to the vessel 502 and at the opposite end to a buoy, such as buoy 510 attached to the steamer 506. As shown in FIGS. 5A-5C, the streamers 504-508 ideally form a planar acquisition surface oriented approximately parallel to a free surface 512 shown in FIG. 5C. Although in practice the acquisition surface may be smoothly varying due to active sea currents and weather conditions, methods described herein are predicated on the assumption that the acquisition surface is planar. FIGS. 5A-5C also include a Cartesian coordinate system 514 in order to specify coordinate locations of points within the fluid volume with respect to three orthogonal, spatial coordinate axes labeled $x_1$, $x_2$ and $x_3$. The $x_1$ coordinate uniquely specifies the position of a point in a direction parallel to the length of the streamers, and the $x_2$ coordinate uniquely specifies the position of a point in a direction perpendicular to the $x_1$ axis and parallel to the free surface 512, and the $x_3$ coordinate uniquely specifies the position of a point perpendicular to the $x_1x_2$-plane. A regularization method or a projection method is typically applied to the actual coordinate locations of the receivers and streamers in order to create receiver locations within the Cartesian coordinate system shown in FIG. 5.

The top-plan view of the streamers 504-508 shown in FIG. 5B reveals that the receivers represented by solid disks, such as solid disk 516, are spaced along each streamer in the $x_1$-direction by regular intervals denoted by $\Delta x_1^R$ and the streamers are spaced in the $x_2$-direction by regular intervals denoted by $\Delta x_2^R$. As shown in FIG. 5B, the receivers are arranged to form an ideally regularly spaced rectangular grid of receivers. As explained above, in practice, the intervals between receivers and streamers may not be regularly spaced. As a result, regularization methods or projection methods can be used to obtain regular interval spacing between receivers and streamers for the computational methods described below. However, computational methods described herein are not intended to be limited to regularly spaced receivers as shown in FIG. 5. It is straightforward to extend the following mathematical description to deal with irregularly spaced receivers.

FIG. 5C shows a side or $x_1x_3$-plane view of the streamer 506 located beneath the free surface 512 and represents a snapshot, at an instant in time, of the undulating free surface 512. The depth, $x_3$, of the receivers can be estimated from hydrostatic pressure measurements taken at depth controllers (not shown) attached to the streamers. The depth controllers are typically placed at about 300 meter intervals along each streamer and streamer depth values for intermediate receiver locations can be interpolated. Dashed line 518 represents the geoid, which is a hypothetical surface of the earth that coincides everywhere with mean sea level and is used to define zero elevation. In other words, the depth $x_3$ is estimated with respect to the geoid, which corresponds to the free surface 512 having an average elevation of "0." By convention, the positive $x_3$-spatial direction points downward into the fluid volume and away from the free surface 512. The coordinate system 514 is used to specify the coordinate location of each receiver as a 3-tuple. For example, as shown in FIG. 5B, the coordinate position of the receiver 516 is specified by a 3-tuple $(x_1^R, x_2^R, x_3^R)$, where the superscript R indicates the coordinates are associated with a receiver.

Each receiver is a seismic sensor, such as a hydrophone or a geophone, that measures the scattered wavefield. For example, a hydrophone measures the scattered pressure wavefield and a geophone measures the scattered velocity wavefield. The scattered wavefield is mathematically represented by:

$$p^{sct}(x_1^R, x_2^R, x_3^R; t)$$

where $p^{sct}$ represents the digitally encoded seismic signal data associated with a scattered pressure wavefield, scattered velocity wavefield, or any other detectable scattered wavefield measured at the receiver location $(x_1^R, x_2^R, x_3^R)$ at a time t. The coordinates $(x_1^R, x_2^R, x_3^R; t)$ represent coordinates in the space-time domain. Each seismic signal represents the scattered wavefield measured at each receiver location, and each seismic signal is stored as digitally encoded data $p^{sct}$ that represents the measured scattered wavefield at the space-time coordinates $(x_1^R, x_2^R, x_3^R; t)$.

Note that the scattered wavefield $p^{sct}$ represents the wavefields that traveled from the subterranean formation but does not include the incident wavefields, which are wavefields transmitted directly from the one or more sources to the receiver or wavefields that traveled from the one or more sources to the free surface then to the receiver. Filtering is applied to the wavefield data detected by a receiver in order to remove the incident wavefield and obtain the scattered wavefield.

The scattered wavefield detected by each receiver actually includes an up-going wavefield component and a down-going wavefield component associated with ghost reflections from the free surface. In FIG. 5C, directional arrow 520 represents the direction of an up-going wavefield detected by the receiver 516. Directional arrow 522 represents the direction of a down-going wavefield reflected at the free surface 512 and also detected by the receiver 516. As a result, the scattered wavefield $p^{sct}$ is a combination of the up-going and down-going wavefields, with the down-going wavefield phase shifted with respect to the up-going wavefield. In other words, the scattered wavefield includes a ghost wavefield contribution. Methods described below are directed to deghosting the scattered wavefield $p^{sct}$ to produce a deghosted wavefield $p^{dgh}$ in the space-time domain.

B. Transforming the Wavefield from the Space-Time Domain to a Wavenumber-Frequency Domain Deghosting the scattered wavefield $p^{sct}$ begins by transforming the scattered wavefield from the space-time domain to the wavefield-frequency domain. After the scattered wavefield $p^{sct}$ has been collected and stored, the scattered wavefield is transformed from the space-time domain to the space-frequency domain using a Fourier transform represented by:

$$\hat{p}^{sct}(x_1^R, x_2^R, x_3^R; \omega) = \Delta t \sum_{s=0}^{S-1} p^{sct}(x_1^R, x_2^R, x_3^R; s\Delta t)\exp(-j\omega s\Delta t)$$

where $j=\sqrt{-1}$ is the imaginary unit;
S is the number of time samples;
$\Delta t$ is the mesh size in the time domain;
s is a sample index in the time domain;
$\omega=2\pi f$ is the angular frequency;
f is a real valued frequency measured at the receiver; and
$\hat{p}^{sct}$ represents the scattered wavefield in the space-frequency domain.

In practice, the Fourier transform can be executed as a discrete Fast Fourier transform ("DFFT") for speed and computational efficiency. Note that the Fourier transform used to transform the scattered wavefield from the space-time domain to the space-frequency domain is based on the scattered wavefield measured at the receivers being causal. In other words, it is assumed that after a sound source creates a sound impulse, the receivers measure the resulting scattered wavefield (i.e., $p^{sct}(x_1^R, x_2^R, x_3^R; t)=0$ for t<0).

The scattered wavefield $\hat{p}^{sct}$ in the space-frequency domain can then be transformed to a scattered wavefield in the wavenumber-frequency domain using a Fourier transform. The wavenumber-frequency domain is also referred to as the "spectral domain." In particular, the scattered wavefield is transformed with respect to the spatial coordinates in the $x_1 x_2$-plane of the spatial domain to wavenumber coordinates in an $k_1 k_2$-plane of the spectral domain. As a result, the discrete Fourier transform from the spatial portion of the space-frequency domain to the wavenumber portion of the spectral domain is mathematically represented by:

$$\tilde{p}_{n,m}^{sct} = \tilde{p}^{sct}(k_{1,n}, k_{2,m}, x_3^R; \omega)$$

$$= \Delta x_1^R \Delta x_2^R \sum_{q=1}^{N} \sum_{r=1}^{M} \exp(jk_{1,n}x_{1,q}^R + jk_{2,m}x_{1,r}^R)\hat{p}^{sct}(x_{1,q}^R, x_{2,r}^R, x_3^R; \omega)$$

where $k_{1,n} = \left(-\frac{1}{2}N + n\right)\Delta k_1$ and $k_{2,m} = \left(-\frac{1}{2}M + m\right)\Delta k_2$ with $\Delta k_1 = \frac{2\pi}{N\Delta x_1^R}$ and $\Delta k_2 = \frac{2\pi}{M\Delta x_2^R}$;

N is the number of receivers located along the streamers;
M is the number of streamers;
q is a receiver index in the spatial domain;
r is a streamer index in the spatial domain;
n=1, . . . , N is an integer in the spectral domain; and
m=1, . . . , M is an integer in the spectral domain.

In practice, the Fourier transform can be executed as a DFFT for speed and computational efficiency. The scattered wavefield $\tilde{p}_{n,m}^{sct}$ is a matrix element in a scattered wavefield matrix given by:

$$[\tilde{p}_{n,m}^{sct}] = \begin{bmatrix} \tilde{p}_{1,1}^{sct} & \tilde{p}_{1,2}^{sct} & \cdots & \tilde{p}_{1,M}^{sct} \\ \tilde{p}_{2,1}^{sct} & \tilde{p}_{2,2}^{sct} & & \\ \vdots & & \ddots & \\ \tilde{p}_{N,1}^{sct} & & & \tilde{p}_{N,M}^{sct} \end{bmatrix}$$

Each matrix element $\tilde{p}_{n,m}^{sct}$ in the scattered wavefield matrix represents the scattered wavefield in the spectral domain at the $n^{th}$ receiver of the $m^{th}$ streamer and includes a contribution from the down-going wavefield created by ghost reflections. The Fourier transforms described above are both spectral domain transformations.

The deghosted wavefield in the spectral domain at the zero depth or geoid level is defined by:

$$\tilde{p}_{n,m}^{dgh} = \tilde{p}^{dgh}(k_{1,n}, k_{2,m}, 0; \omega) = \frac{\tilde{p}^{sct}(k_{1,n}, k_{2,m}, x_3^R; \omega)}{2j\sin(\gamma_{n,m}x_3^R)}$$

where $\gamma_{n,m} = \sqrt{\frac{\omega^2}{c^2} - k_{1,n}^2 - k_{2,m}^2}$ and c is the acoustic wave speed in the fluid (See "Seismic Applications of Acoustic Reciprocity," by J. T. Fokkema and P. M. van den Berg, Elsevier, London, copyright 1993). The deghosted wavefield $\tilde{p}_{n,m}^{sct}$ is a matrix element in a deghosted wavefield matrix given by:

$$[\tilde{p}_{n,m}^{dgh}] = \begin{bmatrix} \tilde{p}_{1,1}^{dgh} & \tilde{p}_{1,2}^{dgh} & \cdots & \tilde{p}_{1,M}^{dgh} \\ \tilde{p}_{2,1}^{dgh} & \tilde{p}_{2,2}^{dgh} & & \\ \vdots & & \ddots & \\ \tilde{p}_{N,1}^{dgh} & & & \tilde{p}_{N,M}^{dgh} \end{bmatrix}$$

Each matrix element $\tilde{p}_{n,m}^{dgh}$ in the wavefield matrix represents the deghosted wavefield in the spectral domain at the zero depth or geoid level (i.e., $x_3^R=0$) at the $n^{th}$ receiver of the $m^{th}$ streamer without the contribution from the downgoing wavefield created by ghost reflections.

The deghosted wavefield $\tilde{p}_{n,m}^{dgh}$ is solved for in the spectral domain by formulating an optimization problem for which the deghosted wavefield $\tilde{p}_{n,m}^{dgh}$ is a solution subject to the constraints that the total variation of $\tilde{p}_{n,m}^{dgh}$ is minimal and the deghosted wavefield $\tilde{p}_{n,m}^{dgh}$ has a stable algebraic inverse. The optimization problem for which the deghosted wavefield is a solution with total minimal variation and has a stable algebraic inverse is described in the next subsection.

C. The Optimization Problem

The optimization problem is described as iteratively determining a deghosted wavefield that minimizes a cost functional given by:

$$C = F F_i^R$$

where F is a least-squares functional, $F_i^R$ is a multiplicative regularizer, and i is a positive integer iteration index (i.e., i=1, 2, 3, . . . ) described in greater detail below. The functional F is a real-valued function of the scattered and deghosted wavefield matrices and is given by:

$$F(\tilde{p}_{n,m}^{dgh}) = \frac{\|[\tilde{p}_{n,m}^{sct}] - [L_{n,m}\tilde{p}_{n,m}^{dgh}]\|^2}{\|[\tilde{p}_{n,m}^{sct}]\|^2}$$
$$= \eta \sum_{n,m} |\tilde{p}_{n,m}^{sct} - L_{n,m}\tilde{p}_{n,m}^{dgh}|^2$$

where $$[\tilde{p}_{n,m}^{sct}] - [L_{n,m}\tilde{p}_{n,m}^{dgh}] = \begin{bmatrix} \tilde{p}_{1,1}^{sct} & \tilde{p}_{1,2}^{sct} & \cdots & \tilde{p}_{1,M}^{sct} \\ \tilde{p}_{2,1}^{sct} & \tilde{p}_{2,2}^{sct} & & \\ \vdots & & \ddots & \\ \tilde{p}_{N,1}^{sct} & & & \tilde{p}_{N,M}^{sct} \end{bmatrix} -$$

$$\begin{bmatrix} L_{1,1}\tilde{p}_{1,1}^{dgh} & L_{1,2}\tilde{p}_{1,2}^{dgh} & \cdots & L_{1,M}\tilde{p}_{1,M}^{dgh} \\ L_{2,1}\tilde{p}_{2,1}^{dgh} & L_{2,2}\tilde{p}_{2,2}^{dgh} & & \\ \vdots & & \ddots & \\ L_{N,1}\tilde{p}_{N,1}^{dgh} & & & L_{N,M}\tilde{p}_{N,M}^{dgh} \end{bmatrix}$$

$\|\cdot\|^2$ is the square of the Frobenius matrix norm;
$L_{n,m}=2j \sin(\gamma_{n,m}x_3^R)$ multiplies each of the deghosted wavefield matrix elements;
$\eta=[\|[\tilde{p}_{n,m}^{sct}]\|^2]^{-1}=[\Sigma_{n,m}|\tilde{p}_{n,m}^{sct}|^2]^{-1}$; and
$|\cdot|^2$ is the square of the distance in the complex plane.

The cost functional C is iteratively minimized with respect to $\tilde{p}_{n,m}^{dgh}$ using a conjugate gradient method described below in the subsection II.E below. For each iteration i, the deghosted wavefield $\tilde{p}_{n,m}^{dgh}$ is updated by an iterative deghosted wavefield matrix element $\tilde{p}_{n,m}^{dgh}$ (i.e., $\tilde{p}_{n,m}^{dgh}=\tilde{p}_{n,m;i}^{dgh}$) defined below in subsection II.E.

Formulating the functional F as a least-squares problem leads to optimum deghosted wavefield matrix elements $\tilde{p}_{n,m}^{dgh}$ with the residue matrix elements given by:

$$r_{n,m}=\tilde{p}_{n,m}^{sct}-L_{n,m}\tilde{p}_{n,m}^{dgh}$$

The "best" fit deghosted wavefield $\tilde{p}_{n,m}^{dgh}$ in the least-squares sense minimizes the sum of the squared residues. By formulating the functional $F(\tilde{p}_{n,m}^{dgh})$ as a least-squares optimization problem, the optimization problem is an ill-posed problem because $L_{n,m}$ exhibits a zero (notch) in the spectral domain.

The multiplicative regularization factor $F_i^R(\tilde{p}_{n,m}^{dgh})$ is formulated to prevent high-oscillations of $\tilde{p}_{n,m}^{dgh}$ in iteratively determining the deghosted wavefield $\tilde{p}_{n,m}^{dgh}$ that minimizes the cost functional. The multlpicative regularization factor is given by:

$$F_i^R(\tilde{p}_{n,m}^{dgh}) = A^{-1} \sum_{n,m} \frac{|\nabla \tilde{p}_{n,m}^{dgh}|^2 + \delta_i^2}{|\nabla \tilde{p}_{n,m;i-1}^{dgh}|^2 + \delta_i^2} = \sum_{n,m} b_{n,m;i}^2 [|\nabla \tilde{p}_{n,m}^{dgh}|^2 + \delta_i^2]$$

where $\nabla$ is the gradient operator in the wavenumber domain and is mathematically represented by:

$$\nabla = \frac{\partial}{\partial k_1}\hat{k}_1 + \frac{\partial}{\partial k_2}\hat{k}_2$$

with $\hat{k}_{1,1}$ and $\hat{k}_{2,2}$ representing orthogonal basis vectors in the $k_1k_2$-plane of the wavenumber-frequency domain. The gradient operator $\nabla$ can be implemented computationally using a finite difference method. Like with the functional F, for each iteration i, the deghosted wavefield $\tilde{p}_{n,m}^{dgh}$ in the multiplicative regularization factor $F_i^R(\tilde{p}_{n,m}^{dgh})$ is updated by $\tilde{p}_{n,m;i}^{dgh}$. As presented above, the multiplicative regularization factor includes $$\delta_i^2 = A^{-1} \sum_{n,m} |\nabla \tilde{p}_{n,m;i-1}^{dgh}|^2$$

which is the mean value of $|\nabla \tilde{p}_{n,m;i-1}^{dgh}|^2$ over the ranges of n and m;

$$A = \sum_{n,m} 1 = N \times M$$

and $$b_{n,m;i}^2 = A^{-1} \frac{1}{|\nabla \tilde{p}_{n,m;i-1}^{dgh}|^2 + \delta_i^2}$$

The multiplicative regularization factor $F_i^R(\tilde{p}_{n,m}^{dgh})$ is a real valued function designed to avoid incorporating outcomes from tuning experiments. The variation in the multiplicative regularization factor is limited to variation in the behaviour as a function of the spatial wave numbers. The multiplicative regularization factor $F_i^R(\tilde{p}_{n,m}^{dgh})$ also has the advantage that the regularization is strong during the first iterations, but it is reduced during later iterations, without the need for tuning experimental results.

D. A Preconditioner

For each iteration i, a necessary condition for a minimum is that the gradient of the cost functional $F(\tilde{p}_{n,m}^{dgh}) F_i^R(\tilde{p}_{n,m}^{dgh})$ equals zero for each (n, m) matrix element as follows:

$$\nabla[F(\tilde{p}_{n,m}^{dgh})F_i^R(\tilde{p}_{n,m}^{dgh})] = \nabla F(\tilde{p}_{n,m}^{dgh})F_i^R(\tilde{p}_{n,m}^{dgh}) + F(\tilde{p}_{n,m}^{dgh})\nabla F_i^R(\tilde{p}_{n,m}^{dgh})$$
$$= -\eta L_{n,m}^*[\tilde{p}_{n,m}^{sct} - L_{n,m}\tilde{p}_{n,m}^{dgh}]F_i^R(\tilde{p}_{n,m}^{dgh}) -$$
$$F(\tilde{p}_{n,m}^{dgh})\nabla \cdot [b_{n,m;i}^2 \nabla \tilde{p}_{n,m}^{dgh}]$$
$$= 0$$

where the symbol "*" represents the complex conjugate. Linearizing the gradient of the cost functional can be accomplished with $F(\tilde{p}_{n,m}^{dgh})=F(\tilde{p}_{n,m;i-1}^{dgh})$ and $F_i^R(\tilde{p}_{n,m}^{dgh})=F_i^R(\tilde{p}_{n,m;i-1}^{dgh})=1$, which simplifies to $$\tilde{p}_{n,m;i}^{dgh} = \frac{L_{n,m}^* \tilde{p}_{n,m}^{sct}}{L_{n,m}^* L_{n,m} - [F(\tilde{p}_{n,m;i-1}^{dgh})/\eta]\mathrm{diag}[\nabla \cdot (b_{n,m;i}^2 \nabla \tilde{p}_{n,m;i-1}^{dgh})]}$$

The equation for $\tilde{p}_{n,m;i}^{dgh}$ leads to the Jacobi preconditioner given by:

$$p_{n,m;i} = \frac{1}{L_{n,m}^* L_{n,m} - [F(\tilde{p}_{n,m;i-1}^{dgh})/\eta]\mathrm{diag}[\nabla \cdot (b_{n,m;i}^2 \nabla)]}$$

The Jacobi preconditioner is a matrix element differential operator and is the inverse diagonal matrix element for $\tilde{p}_{n,m;i}^{dgh}$ presented above.

E. Conjugate Gradient Method

An iterative expression for each deghosted wavefield matrix element $P_{n,m}^{dgh}$ in the wavenumber-frequency domain is given by:

$$\tilde{p}_{n,m;i}^{dgh} = \tilde{p}_{n,m;i-1}^{dgh} + \alpha_i v_{n,m;i}$$

The parameter $\alpha_i$ is real valued and is referred to as the "minimizer," and $v_{n,m;i}$ is the update direction. In this subsection, the mathematical expressions used to iteratively compute the iterative deghosted wavefield matrix element $\tilde{p}_{n,m;i}^{dgh}$ for each iteration i are derived by minimizing the cost functional C as follows. From the residue rewritten in terms of the iterative deghosted wavefield $$r_{n,m;i} = \tilde{p}_{n,m}^{sct} - L_{n,m}\tilde{p}_{n,m;i}^{dgh}$$

the cost functional C simplifies to a polynomial in $\alpha_i$ as follows:

$$C = \left\{\eta\sum_{n,m}|r_{n,m;i-1} - \alpha_i L_{n,m}v_{n,m;i}|^2\right\}$$
$$\left\{\sum_{n,m} b_{n,m;i}^2\left(|\nabla \tilde{p}_{n,m;i-1}^{dgh} + \alpha_i \nabla v_{n,m;i}|^2 + \delta_i^2\right)\right\}$$
$$= \{A_2\alpha_i^2 + A_1\alpha_i + A_0\}\{B_2\alpha_i^2 + B_1\alpha_i + B_0\}$$

where the coefficients $A_2$, $A_1$, $A_0$, $B_2$, $B_1$ and $B_0$ are given by:

$$A_2 = \eta\sum_{n,m}|L_{n,m}v_{n,m;i}|^2;$$
$$A_1 = -\eta\sum_{n,m}2\mathrm{Re}[r_{n,m;i-1}(L_{n,m}v_{n,m;i})^*];$$
$$A_0 = \eta\sum_{n,m}|r_{n,m;i-1}|^2 = F(\tilde{p}_{n,m;i-1}^{dgh});$$
$$B_2 = \sum_{n,m}b_{n,m;i}^2|\nabla v_{n,m;i}|^2;$$
$$B_1 = \sum_{n,m}2\mathrm{Re}[b_{n,m;i}^2(\nabla\tilde{p}_{n,m;i-1}^{dgh})\cdot\nabla v_{n,m;i}^*]; \text{ and}$$
$$B_0 = \sum_{n,m}b_{n,m;i}^2[|\nabla\tilde{p}_{n,m;i-1}^{dgh}|^2 + \delta_i^2]$$

The cost functional rewritten as a fourth degree polynomial in $\alpha_i$ is given by:

$$C(\alpha_i) = A_2B_2\alpha_i^4 + (A_2B_1 + A_1B_2)\alpha_i^3 + (A_2B_0 + A_1B_1 + A_0B_2)\alpha_i^2 + (A_1B_0 + A_0B_1)\alpha_i + A_0B_0$$

Having rewritten the cost functional as function of $\alpha_i$, the cost functional can be minimized with respect to $\alpha_i$ to obtain a cubic equation given by:

$$a_3\alpha_i^3 + a_2\alpha_i^2 + a_1\alpha_i + a_0 = 0$$

where the coefficients $a_1$, $a_2$, $a_3$ and $a_0$ are given by:

$$a_3 = 4A_2B_2,$$
$$a_2 = 3(A_2B_1 + A_1B_2),$$
$$a_1 = 2(A_2B_0 + A_1B_1 + A_0B_2), \text{ and}$$
$$a_0 = (A_1B_0 + A_0B_1)$$

The cubic equation has one real root and two complex conjugate roots. The real root or minimizer is given by:

$$\alpha_i = \frac{-1}{3a_3}\left\{a_2 + \sqrt[3]{\frac{1}{2}\left[2a_2^3 - 9a_3a_2a_1 + 27a_3^2a_1 + \sqrt{-27a_3^2\Omega}\right]} + \sqrt[3]{\frac{1}{2}\left[2a_2^3 - 9a_3a_2a_1 + 27a_3^2a_1 - \sqrt{-27a_3^2\Omega}\right]}\right\}$$

where $\Omega = 18a_3a_2a_1a_0 - 4a_2^3a_3 + a_2^2a_1^2 - 4a_3a_1^3 - 27a_3^2a_2^2$. As long as $\Omega < 0$, the cubic equation has the one real valued root, $\alpha_i$, and two complex conjugate roots. In one embodiment, the update direction $v_{v,m;i}$ is taken as the Polak-Ribiere conjugate gradient direction given by:

$$v_{v,m;1} = g_{n,m;1}$$
$$v_{v,m;i} = g_{n,m;i} + \frac{\sum_{n,m}g_{n,m;i}[g_{n,m;i} - g_{n,m;i-1}]^*}{\sum_{n,m}|g_{n,m;i-1}|^2}v_{n,m;i-1}$$

where $g_{n,m;i}$ is the preconditioned gradient of the cost functional C at the previous deghosted wavefield $P_{n,m;i-1}^{dgh}$ and is given by $$g_{n,m;i} = p_{n,m;i}[L_{n,m}^*r_{n,m;i-1} + [F(\tilde{p}_{n,m;i-1}^{dgh})/\eta]\nabla\cdot(b_{n,m;i}^2\nabla\tilde{p}_{n,m;i-1}^{dgh})]$$

The preconditioned gradient includes the Jacobi preconditioner $$p_{n,m;i} = \frac{1}{\tilde{L}_{n,m}^*\tilde{L}_{n,m} - [F(\tilde{p}_{n,m;i-1}^{dgh})/\eta]\mathrm{diag}[\nabla\cdot(b_{n,m;i}^2\nabla)]}$$

where $$\tilde{L}_{n,m} = 2j\sin(\tilde{\gamma}_{n,m}x_3^R); \text{ and}$$
$$\tilde{\gamma}_{n,m} = \sqrt{\left(\frac{\omega - j\varepsilon}{c}\right)^2 - k_{1,n}^2 - k_{2,m}^2}$$

Note that the equation for $\tilde{\gamma}_{n,m}$ is a modified version of the equation $\gamma_{n,m}$ obtained by changing the angular frequency from the real valued angular $\omega$ to include a complex term, $\omega-j\varepsilon$. The constant $\varepsilon$ is a real valued positive number, which is only inserted to stabilize the preconditioner $p_{n,m;i}$.

Although the Polak-Ribiere conjugate gradient direction is useful for non-linear problems, embodiments are not limited to using the Polak-Ribiere conjugate gradient direction. In other embodiments, other kinds of conjugate gradient directions can be used. For example, in another embodiment, the conjugate gradient direction can be computed using the Fletcher-Reeves conjugate gradient direction given by:

$$v_{v,m;i} = g_{n,m;i} + \frac{\sum_{n,m} |g_{n,m;i}|^2}{\sum_{n,m} |g_{n,m;i-1}|^2} v_{n,m;i-1}$$

In still another embodiment, the conjugate gradient direction can be computed using the Hestenes-Stiefel conjugate gradient direction given by:

$$v_{v,m;i} = g_{n,m;i} + \frac{\sum_{n,m} g_{n,m;i}[g_{n,m;i} - g_{n,m;i-1}]^*}{\sum_{n,m} g_{n,m;i-1}[g_{n,m;i} - g_{n,m;i-1}]^*} v_{n,m;i-1}$$

F. Inverse Transforming the Approximate Wavefield from the Wavenumber-frequency Domain to the Space-time Domain After the deghosted wavefield matrix elements $\tilde{p}_{n,m;i}^{dgh}$ that minimize the cost functional have been determined, each deghosted wavefield matrix element $\tilde{p}_{n,m;i}^{dgh}$ may be transformed from the spectral domain to the space-time domain. A discrete inverse Fourier transform from the spectral domain to the space-frequency domain is expressed mathematically by:

$$\hat{p}^{dgh}(x_1^R, x_2^R, x_3^R; \omega) = \Delta k_1 \Delta k_2 \sum_{n=1}^{N} \sum_{m=1}^{M} \exp(-jk_{1,n}x_{1,q}^R - jk_{2,m}x_{1,r}^R) \tilde{p}^{dgh}(k_{1,n}, k_{2,m}, x_3^R; \omega).$$

The inverse discrete Fourier transform that transforms the deghosted wavefield $\hat{p}^{dgh}(\omega)$ in the space-frequency domain to the deghosted wavefield in the space-time domain is given by:

$$p^{dgh}(x_1^R, x_2^R, x_3^R; t) = 2Re\left[\Delta\omega \sum_{s=0}^{S-1} \hat{p}^{dgh}(x_1^R, x_2^R, x_3^R; s\Delta\omega)\exp(-js\Delta\omega t)\right]$$

where $\Delta\omega$ is the mesh size in the frequency domain. For computational efficiency, the inverse discrete Fourier transforms used to transform the deghosted wavefield $\tilde{p}^{dgh}(k_{1,n}, k_{2,m}, x_3^R; \omega)$ from the spectral domain to the space-time domain $p^{dgh}(x_1^R, x_2^R, x_3^R; t)$ can be accomplished using an inverse DFFT.

G. Computational Processing Method for Deghosting Seismic Signal Data

Figure 6:
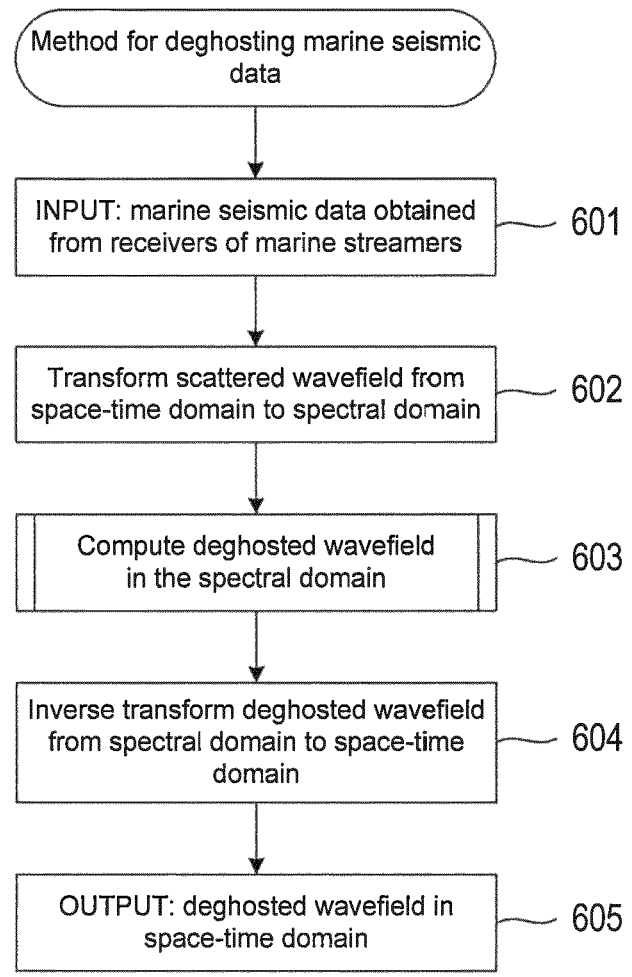
FIG. 6 shows a control-flow diagram of a method for deghosting marine seismic data.
Figure 7:
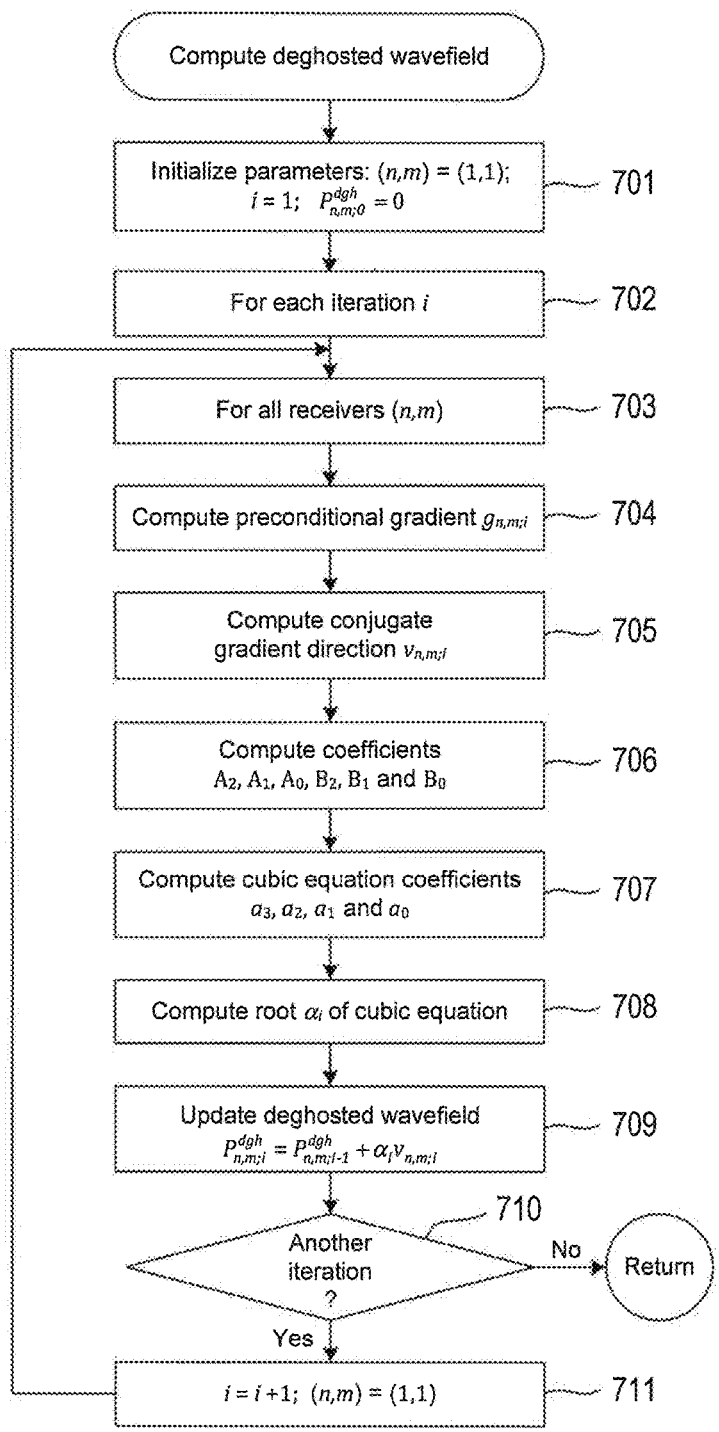
FIG. 7 shows a control-flow diagram of a method for iteratively computing a deghosted wavefield called in block 603 shown in FIG. 6.

FIG. 6 shows a control-flow diagram of a method for deghosting marine seismic data. In block 601, the marine seismic data that digitally encodes a scattered wavefield $p^{sct}$ detected by receivers of marine seismic steamers is received as input as described above with reference to FIG. 5 in subsection II.A. In block 602, the scattered wavefield $p^{sct}$ is transformed from the space-time domain to a spectral domain (i.e., wavenumber-frequency domain) using discrete Fast Fourier transforms to produce a scattered wavefield $\tilde{p}_{n,m}^{sct}$ in the spectral domain, as described above in subsection II.B. In block 603, a method described below with reference to FIG. 7 is called to receive the scattered wavefield $\tilde{p}_{n,m}^{sct}$ in the spectral domain as input and compute a deghosted wavefield $\tilde{p}_{n,m}^{dgh}$ in the spectral domain. In block 604, the deghosted wavefield $\tilde{p}_{n,m}^{dgh}$ computed in block 603 may be transformed from the spectral domain to the space-time domain using inverse discrete Fast Fourier transforms to produce a deghosted wavefield $p^{dgh}$ in the space-time domain, as described in subsection II.F. In block 605, the deghosted wavefield can be stored in a computer-readable medium for further processing.

FIG. 7 shows a control-flow diagram of a method for iteratively computing a deghosted wavefield called in block 603 shown in FIG. 6. The method displayed in FIG. 7 represents one example of many different ways in which the non-linear conjugate method described above in subsection II.E can be executed and is not intended to be exhaustive of all the ways a deghosted wavefield can be computed using the equations described above in subsection II.E. In block 701, indices are initialized. For example, the spectral domain indices n and m are both initialized to "1," iteration index i is initialized to "1," and iterative wavefield matrix elements $\tilde{p}_{n,m;0}^{dgh}$ are initialized to zero value. The for-loop beginning in block 702 begins execution of the operations performed in blocks 703-711. The for-loop beginning in block 703 begins execution of the operations performed in blocks 704-709. In block 704, the preconditioned gradient $g_{n,m;i}$ described above in subsection II.E is computed. In block 705, the conjugate gradient $v_{v,m;i}$ described above in subsection II.E is computed. For example, the conjugate gradient $v_{v,m;i}$ can be computed in one embodiment using the Polak-Ribiere conjugate gradient direction, in another embodiment using the Fletcher-Reeves conjugate gradient direction, and in still another embodiment using the Hestenes-Stiefel conjugate gradient direction. In block 706, the coefficients $A_2$, $A_1$, $A_0$, $B_2$, $B_1$ and $B_0$ are computed as described above in subsection II.E. In block 707, the cubic equation coefficients $a_1$, $a_2$, $a_3$ and $a_0$ are computed as described above in subsection II.E. In block 708, the real root $\alpha_i$ (i.e., the minimizer) is computed as described above in subsection II.E. In block 709, the deghosted wavefield $\tilde{p}_{n,m;i}^{dgh}$ for each receiver (n,m) is updated. In block 710, when another iteration is desired, the method proceeds to block 711 where the iteration parameter i is incremented, the indices n and in are both initialized to "1," and the method returns to block 703.

Figure 8:
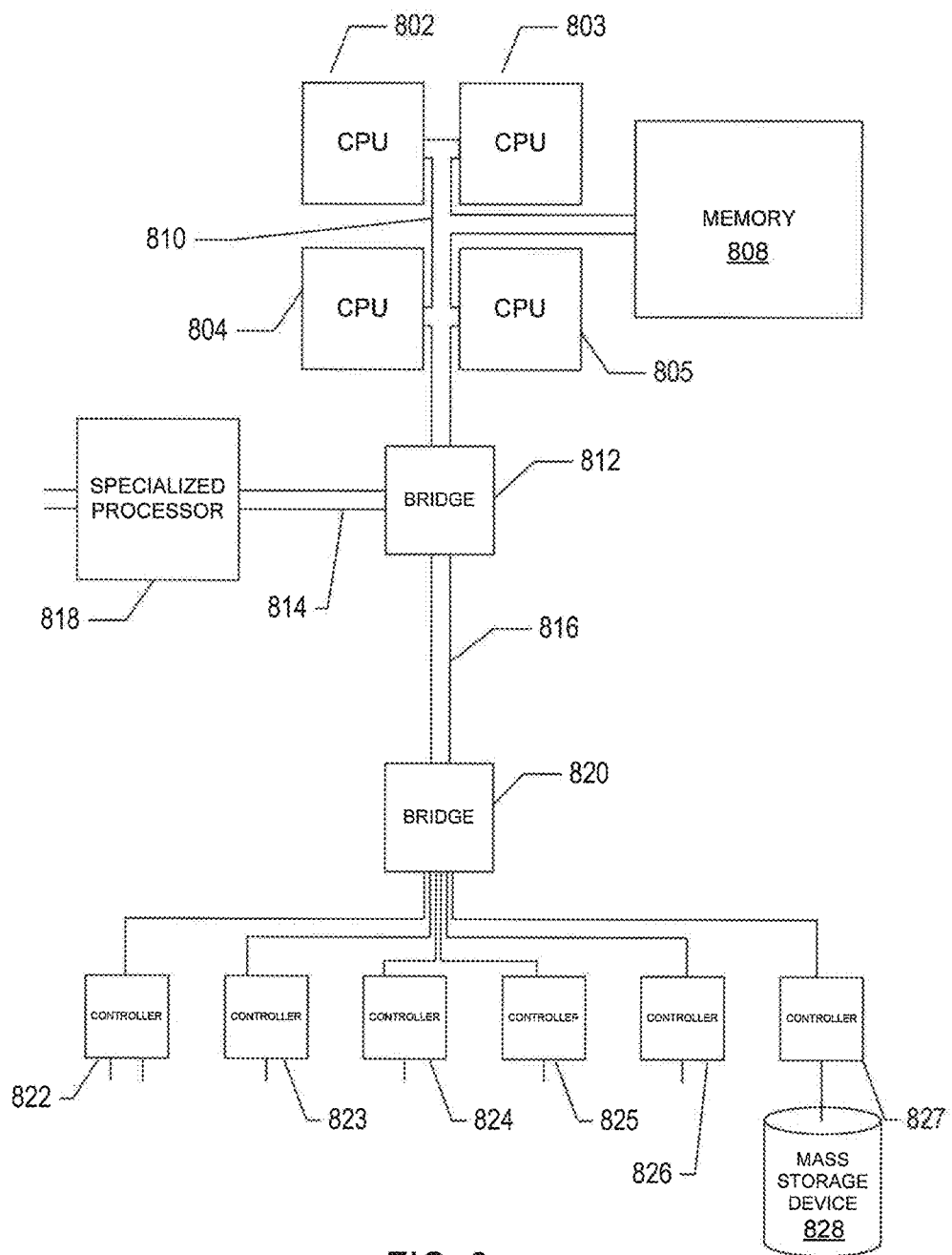
FIG. 8 shows one example of a generalized computer system that executes an efficient method for deghosting a scattered wavefield.

FIG. 8 shows one illustrative example of a generalized computer system that executes an efficient method for deghosting a scattered wavefield and therefore represents a seismic-analysis data-processing system to which the description is directed. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 802-805, one or more electronic memories 808 interconnected with the CPUs by a CPU/memory-subsystem bus 810 or multiple busses, a first bridge 812 that interconnects the CPU/memory-subsystem bus 810 with additional busses 814 and 816, or other types of high-speed interconnection media, including multiple, high-speed serial interconnects. These busses or serial interconnections, in turn, connect the CPUs and memory with specialized processors, such as a graphics processor 818, and with one or more additional bridges 820, which are interconnected with high-speed serial links or with multiple controllers 822-827, such as controller 827, that provide access to various different types of computer-readable media, such as computer-readable medium 828, electronic displays, input devices, and other such components, subcomponents, and computational resources. The electronic displays, including visual display screen, audio speakers, and other output interfaces, and the input devices, including mice, keyboards, touchscreens, and other such input interfaces, together constitute input and output interfaces that allow the computer system to interact with human users. Computer-readable medium 828 is a data-storage device, including electronic memory, optical or magnetic disk drive, USB drive, flash memory and other such data-storage device. The computer-readable medium 828 can be used to store machine-readable instructions that execute the deghosting computational methods described above with reference to FIGS. 6 and 7 and can be used to store encoded data, during store operations, and from which encoded data can be retrieved, during read operations, by computer systems, data-storage systems, and peripheral devices.

Although various embodiments have been described, it is not intended that this disclosure be limited to these embodiments. For example, embodiments are not intended to be limited to Fourier transforms in order to transform wavefields from the space-time domain to the spectral domain. In other embodiments, any suitable spectral domain transformation can be used, such as a Z-tranformation or a Laplace transformation. In other embodiments, any number of different computational-processing-method implementations that carry out deghosting of marine streamer data based on pressure and velocity wavefields may be designed and developed using various different programming languages and computer platforms and by varying different implementation parameters, including control structures, variables, data structures, modular organization, and other such parameters. The computational representations of wavefields and other computational objects may be implemented in different ways.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A computer system that generates an image of a subterranean formation, the computer system comprising:
one or more processors;
one or more data-storage devices; and
a deghosting routine stored in the one or more data-storage devices and executed by the one or more processors to perform the operations comprising:
transforming wavefield data generated by one or more receivers of a data acquisition surface located in a body of water above the subterranean formation from a space-time domain to a spectral domain to form a scattered wavefield matrix in the spectral domain;
computing a deghosted wavefield matrix at zero depth from the scattered wavefield matrix;
iteratively computing a deghosted wavefield matrix that minimizes a cost functional formed from a multiplicative regularization factor and a matrix norm of a residue matrix, each element of the residue matrix is a difference between an element of the scattered wavefield matrix and an element of the deghosted wavefield matrix adjusted to approximate a corresponding element of the scattered wavefield matrix; and
generating an image of the subterranean formation using at least in part the deghosted wavefield matrix, the image revealing structural information about the subterranean formation without contamination from ghost reflections.

2. The computer system of claim 1, wherein transforming the wavefield data from the space-time domain to the spectral domain further comprises:
applying a first spectral domain transform to transform the wavefield from the space-time domain to a space-frequency domain; and
applying a second spectral domain transform to transform the wavefield from the space-frequency domain to a wavenumber-frequency domain, wherein the wavenumber-frequency domain is the spectral domain.

3. The computer system of claim 1, wherein iteratively computing the deghosted wavefield matrix further comprises:
for each iteration:
computing cubic equation coefficients associated with a cubic equation that represents a minimization of the cost functional;
computing a real-valued root of the cubic equation;
computing a conjugate gradient direction; and
updating the deghosted wavefield associated with each receiver, based on the real-valued root multiplied by the conjugate gradient direction.

4. The computer system of claim 3, wherein computing the cubic coefficients associated with the cubic equation, further comprises
for each receiver:
computing a preconditioned gradient;
computing the conjugate gradient direction as a function of the preconditioned gradient; and
iteratively computing coefficients that in combinations form the cubic equation coefficients.

5. The computer system of claim 4, wherein the preconditioned gradient further comprises a Jacobi preconditioner gradient operator.

6. The computer system of claim 4, wherein the conjugate gradient direction further comprises a Polak-Ribiere conjugate gradient direction.

7. The computer system of claim 4, wherein the conjugate gradient direction further comprises a Fletcher-Reeves conjugate gradient direction.

8. The computer system of claim 4, wherein the conjugate gradient direction further comprises a Hestenes-Stiefel conjugate gradient direction.

9. The computer system of claim 1, wherein the routine further comprises transforming the deghosted wavefield matrix in the spectral domain to a deghosted wavefield matrix in the space-time domain.

10. The computer system of claim 1, wherein the cost functional further comprises a real-valued, least-squares-based functional of the residue matrix multiplied by the multiplicative regularization factor, wherein parameters of the multiplicative regularization factor are not obtained from experimental tuning.

11. In a process that generates an image of a subterranean formation located beneath a body of water using marine seismic techniques in which a source is activated in the body of water above the subterranean formation and receivers located in the body of water detect wavefield responses from the subterranean formation and record the wavefield responses as recorded wavefield data in a data-storage device, the specific improvement comprising:
transforming the recorded wavefield data generated by each receiver from a space-time domain to a spectral domain to form a scattered wavefield matrix in the spectral domain;
computing a deghosted wavefield matrix at zero depth from the scattered wavefield matrix;
computing a deghosted wavefield matrix that minimizes a cost functional formed from a multiplicative regularization factor and a matrix norm of a residue matrix, each element of the residue matrix is a difference between an element of the scattered wavefield matrix and an element of the deghosted wavefield matrix adjusted to approximate a corresponding element of the scattered wavefield matrix;
generating an image of the subterranean formation using at least in part the deghosted wavefield matrix, thereby revealing structural information about the subterranean formation in the image without contamination from ghost reflections.

12. The process of claim 11, wherein transforming the wavefield data from the space-time domain to the spectral domain further comprises:
transforming the wavefield from the space-time domain to a space-frequency domain; and
transforming the wavefield from the space-frequency domain to the spectral domain.

13. The process of claim 11, wherein computing the deghosted wavefield matrix further comprises:
iteratively computing cubic equation coefficients associated with a cubic equation that represents a minimization of the cost functional;
iteratively computing a real-valued root of the cubic equation;
iteratively computing a conjugate gradient direction; and
iteratively updating the deghosted wavefield associated with each receiver, based on the real-valued root multiplied by the conjugate gradient direction.

14. The process of claim 13, wherein computing the cubic coefficients associated with the cubic equation, further comprises
for each receiver:
computing a preconditioned gradient;
computing the conjugate gradient direction as a function of the preconditioned gradient; and
iteratively computing coefficients that in combinations form the cubic equation coefficients.

15. The process of claim 14, wherein the preconditioned gradient further comprises a Jacobi preconditioner gradient operator.

16. The process of claim 11 further comprises transforming the deghosted wavefield matrix in the spectral domain to a deghosted wavefield matrix in the space-time domain.

17. The process of claim 11, wherein the cost functional further comprises a real-valued, least-squares-based functional of the residue matrix multiplied by the multiplicative regularization factor, wherein parameters of the multiplicative regularization factor are not obtained from experimental tuning.

18. A non-transitory computer-readable medium having machine-readable instructions encoded thereon for enabling one or more processors to generate an image of a subterranean formation by performing operations comprising:
storing wavefield data in a data-storage device, the recorded wavefield data generated by one or more receivers located in a body of water above a subterranean formation in response to acoustic energy generated by a source located in the body of water;
transforming the recorded wavefield data from a space-time domain to a spectral domain to form a scattered wavefield matrix in the spectral domain;
iteratively computing a deghosted wavefield matrix that minimizes a cost functional based on a matrix norm of a residue matrix, each element of the residue matrix is a difference between an element of the scattered wavefield matrix and an element of the deghosted wavefield matrix adjusted to approximate a corresponding element of the scattered wavefield matrix; and
generating an image of the subterranean formation using at least in part the deghosted wavefield matrix, the image revealing structural information about the subterranean formation without contamination from ghost reflections.

19. The medium of claim 18, wherein the machine-readable instructions further comprise enabling the one or more processors to perform the operation of transforming the wavefield data from a space-time domain to a spectral domain.

20. The medium of claim 18, wherein the cost functional further comprises a least-squares-based functional of the residue matrix multiplied by a multiplicative regularization factor in a spectral domain.

* * * * *